United States Patent [19]

Nishikawa et al.

[11] Patent Number: 5,016,939

[45] Date of Patent: May 21, 1991

[54] CANVAS TOP TYPE SUNROOF STRUCTURE FOR MOTOR VEHICLE

[75] Inventors: Hiromitsu Nishikawa; Yuichi Kato, both of Yokohama, Japan

[73] Assignee: Ohi Siesakusho Co., Ltd., Yokohama, Japan

[21] Appl. No.: 334,285

[22] Filed: Apr. 6, 1989

[30] Foreign Application Priority Data

| Apr. 7, 1988 | [JP] | Japan | 63-84119 |
| Apr. 7, 1988 | [JP] | Japan | 63-84120 |
| Apr. 7, 1988 | [JP] | Japan | 63-84122 |

[51] Int. Cl.$^5$ ............................................. B60J 7/06
[52] U.S. Cl. .................................... 296/219; 296/223; 296/224
[58] Field of Search .................. 296/217, 219, 223, 224

[56] References Cited

U.S. PATENT DOCUMENTS

| 1,738,060 | 12/1929 | Barnes | 296/219 |
| 2,025,874 | 12/1935 | Lange | 296/219 |
| 2,103,372 | 12/1937 | Lange | 296/219 |
| 3,658,378 | 4/1972 | Sutren | 296/219 |

FOREIGN PATENT DOCUMENTS

| 0064027 | 4/1985 | Japan | 296/219 |
| 61-37019 | 3/1986 | Japan . | |
| 0031819 | 2/1988 | Japan | 296/219 |
| 0061629 | 3/1988 | Japan | 296/219 |
| 0061630 | 3/1988 | Japan | 296/219 |
| 0112217 | 5/1988 | Japan | 296/219 |
| 152750 | 5/1932 | Switzerland | 296/219 |

*Primary Examiner*—Dennis H. Pedder
*Attorney, Agent, or Firm*—Foley & Lardner

[57] ABSTRACT

Herein disclosed is a canvas top type sunroof structure for a motor vehicle having an apertured roof. The sunroof structure comprises a pair of guide members which extend along respective sides of the aperture of the roof; a canvas top adapted to cover the aperture; a front carry member having a front part of the canvas top secured thereto, the front carry member being slidably guided by the guide members; guided carry members slidably guided by the guide members and carrying thereon a major middle part of the canvas top; free carry members carried by the guided carry members respectively, each free carry member carrying thereon the major middle part of the canvas top; a biasing spring for biasing each free carry member upward relative to the corresponding guided carry member; a rear carry member having a rear part of the canvas top secured thereto, the rear carry member being slidably guided by the guide members; an electric drive device for driving the front carry member forward and rearward along the guide members; and a lock device for selectively locking and unlocking the rear carry member to a rear given portion of the roof.

19 Claims, 16 Drawing Sheets

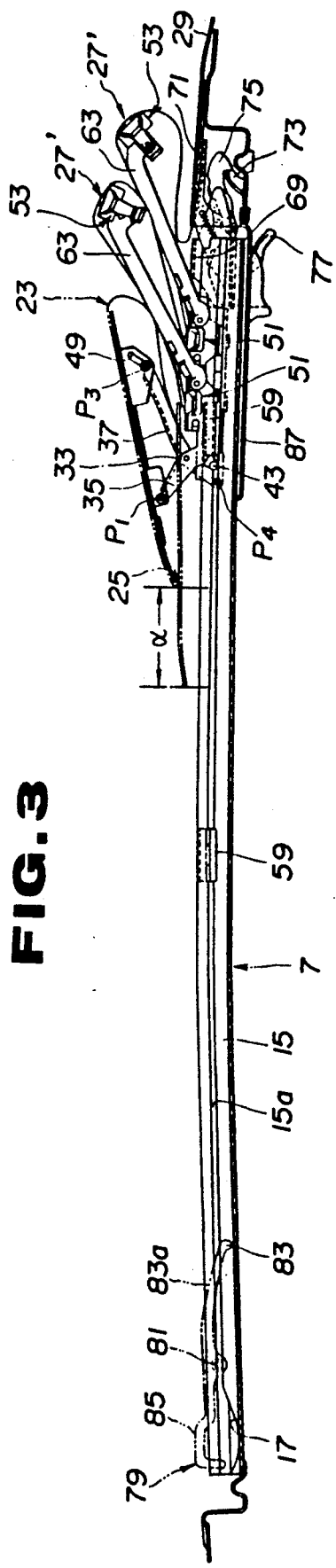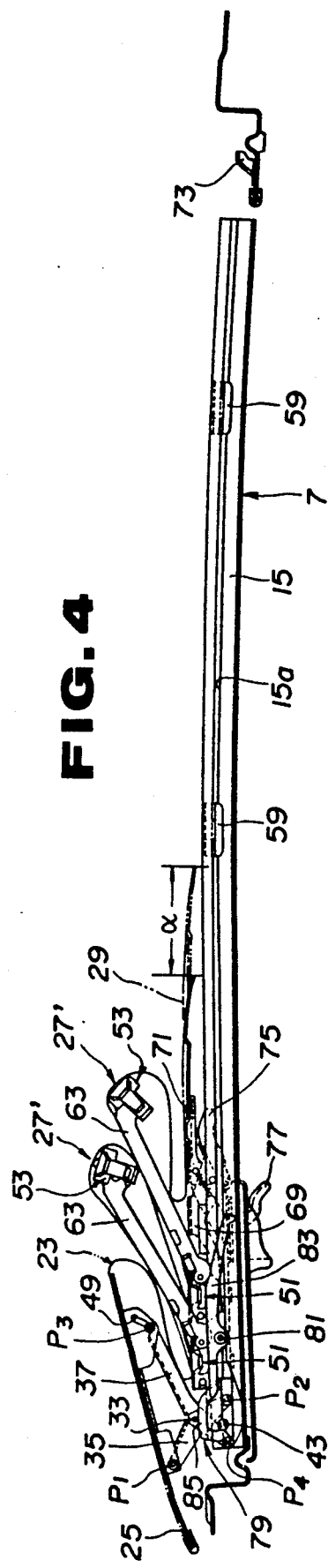

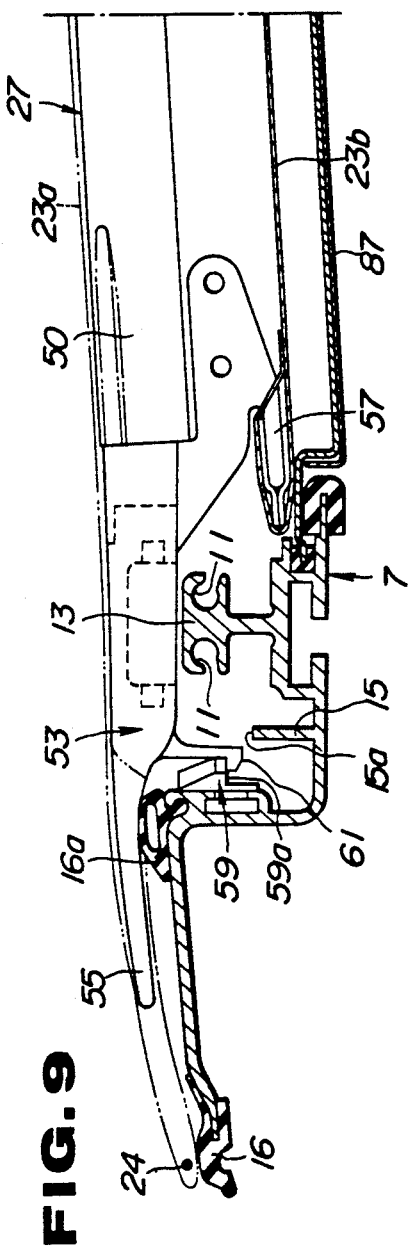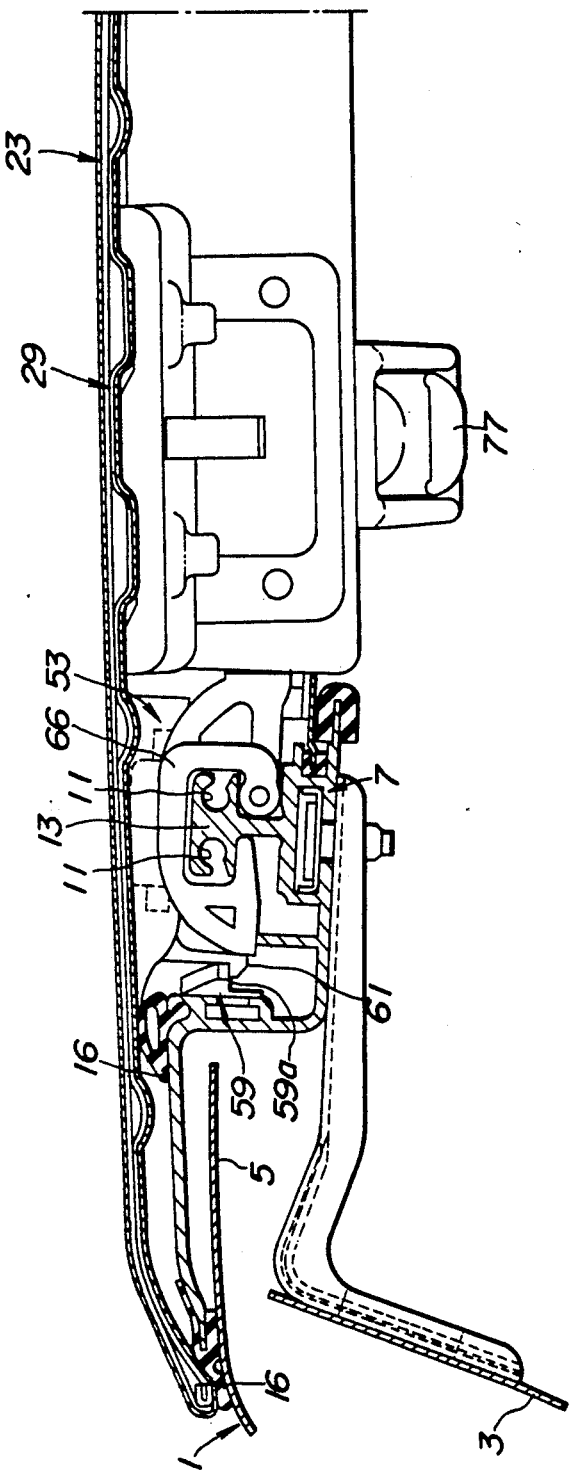
FIG. 9
FIG. 10

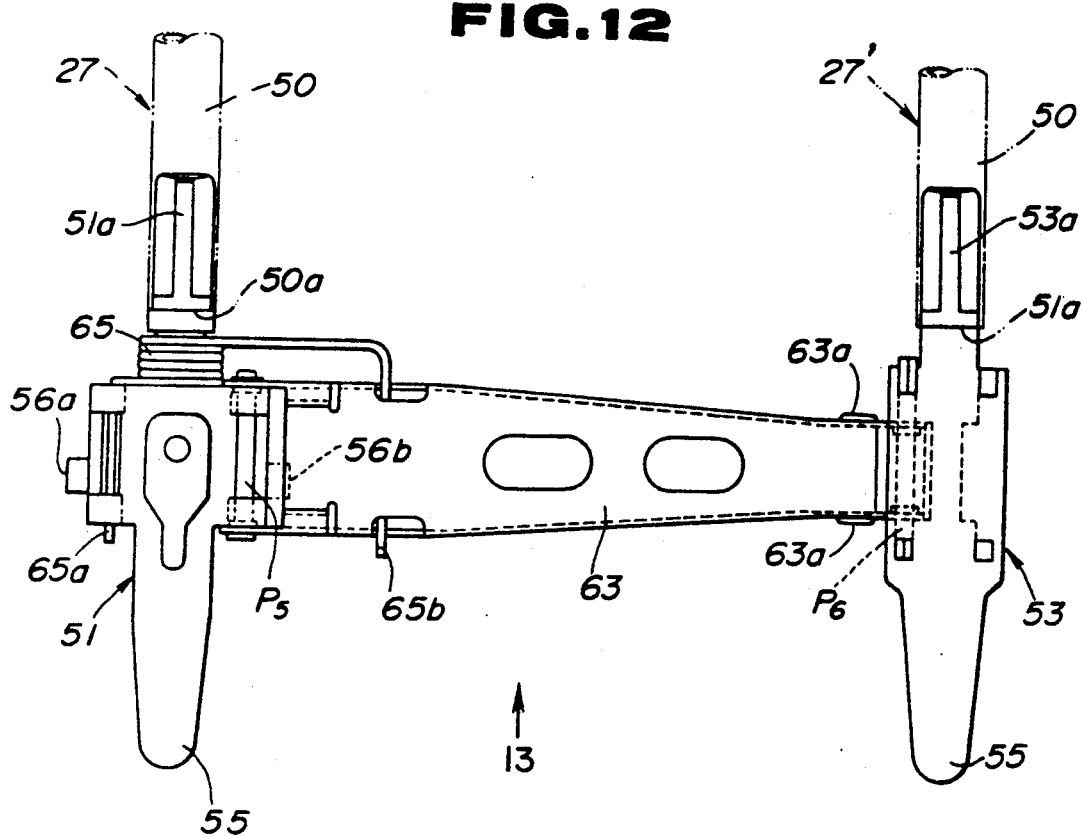
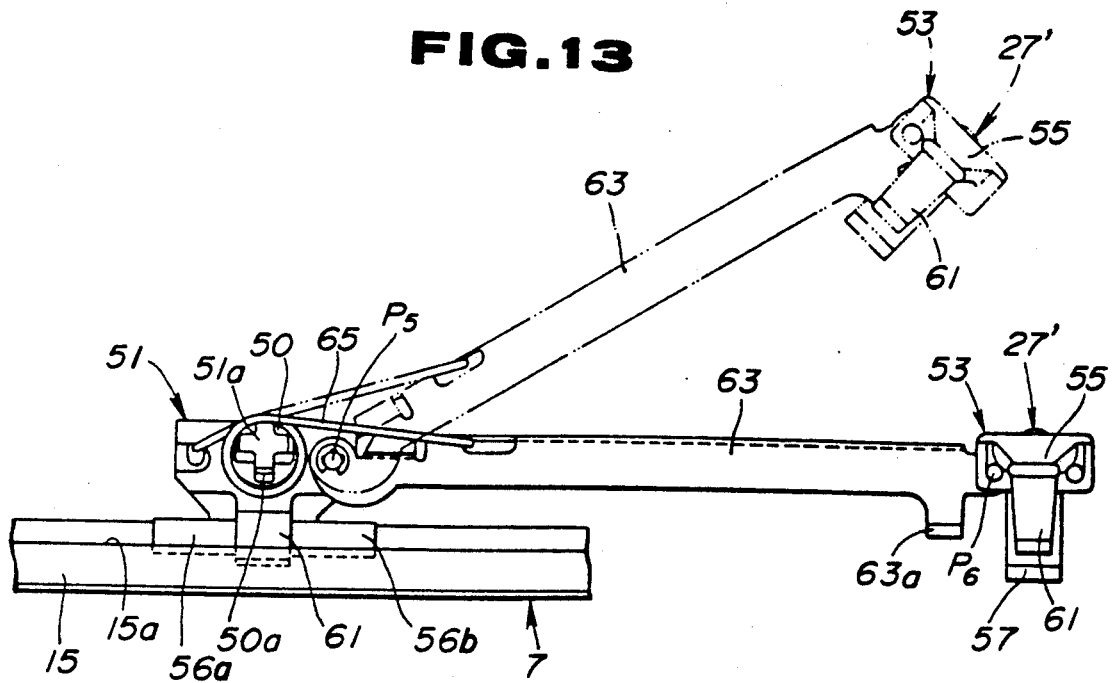

CANVAS TOP TYPE SUNROOF STRUCTURE FOR MOTOR VEHICLE

BACKGROUND OF THE INVENTION

1. Field of the Invention

The present invention relates in general to sunroof structures of a motor vehicle, and more particularly, to sunroof structures of a canvas top type which uses a canvas as a folding top which is adapted to close an aperture formed in a roof of the motor vehicle.

2. Description of the Prior Art

Hitherto, various types of sunroof structures have been proposed and put into practical use particularly in the field of motor vehicles. Some of them are of a so-called canvas top type which uses a canvas as the folding top for closing the roof aperture of the vehicle. One of the sunroof structures of this type is shown in Japanese Utility Model First Provisional Publication No. 61-37019.

In order to clarify the task of the present invention, the sunroof structure of the reference will be outlined in the following.

The conventional sunroof structure comprises two guide rails which extend along lateral sides of an aperture of a vehicle roof. A canvas top for closing the roof aperture has a front part, a major middle part and a rear part which are guided by the guide rails through respective carrying devices. The carrying device for the front part is an elongate front member to which a front end of the canvas is secured and which has longitudinal ends slidably guided by the respective guide rails. The carrying device for the major middle part comprises guided bows and free bows which alternate with each other. Each guided bow supports thereon the canvas top and has longitudinal ends constantly guided by the guide rails, while each free bow supports thereon the canvas top without being constantly guided by the guide rails. Biasing means is connected to each free bow to bias the same upward. The carrying device for the rear part of the canvas top is an elongate rear member which connects the rear end of the canvas top to a rear end of the roof aperture.

When the sunroof sturcture assumes its full-closed position with the canvas top fully covering the roof aperture, the free bows are forced to lie down due to the tension of the fully stretched canvas top against the force of the biasing means. Thus, as the front member of the canvas top moves rearward for opening the roof aperture, the free bows are gradually raised due to reduction of the tension of the canvas top, thereby gradually forming several folds of the canvas top. When the front member comes to its rearmost position to allow the sunroof structure to assume a full-open position, the canvas top is contracted with relatively large folds thereof placed at the rear end of the roof opening.

However, due to its inherent construction, the conventional sunroof structure has the following drawbacks.

First, since the folds of the canvas top, which are formed upon full-opening of the canvas top, are inevitably placed at the rear portion of the roof aperture, the rear passengers of the vehicle can not enjoy a sufficiently large open space above them. In fact, under the full-open condition of the sunroof structure, the folds are placed over the rearseat passengers. Furthermore, the provision of the front member of the canvas top promotes this undesirability.

Second, the folds of the canvas top formed upon full-opening of the canvas top are not assuredly retained. Thus, during movement of the vehicle, the folds tend to flap, producing noisy sounds.

SUMMARY OF THE INVENTION

It is therefore an object of the present invention to provide a canvas top type sunroof structure which is free of the above-mentioned drawbacks.

According to the present invention, there is provided a canvas top type sunroof structure in which the opening movement of the canvas top is achieved from not only the front part thereof but also the rear part thereof.

According to the present invention, there is provided a canvas top type sunroof structure in which, when the canvas top is folded to open the roof aperture, a front carry member of the canvas top is inclined forward, thereby making a unit including the front carry member and the folded canvas top compact in size.

According to the present invention, there is provided a canvas top type sunroof structure, in which when the canvas top assumes an aperture opening position, a front carry member of the canvas top is kept inclined forward, thereby to serve as an air spoiler.

According to the present invention, there is provided a sunroof structure for a motor vehicle having an apertured roof. The sunroof structure comprises a pair of guide members which extend along respective sides of the aperture of the roof; a canvas top adapted to cover the aperture; a front carry member having a front part of the canvas top secured thereto, the front carry member being slidably guided by the guide members; guided carry members slidably guided by the guide members and carrying thereon a major middle part of the canvas top; free carry members carried by the guided carry members respectively, each free carry member carrying thereon the major middle part of the canvas top; biasing means for biasing each free carry member upward relative to the corresponding guided carry member; a rear carry member having a rear part of the canvas top secured thereto, the rear carry member being slidably guided by the guide members; electric drive means for driving the front carry member forward and rearward along the guide members; and lock means for selectively locking and unlocking the rear carry member to a rear given portion of the roof.

BRIEF DESCRIPTION OF THE DRAWINGS

Other objects and advantages of the present invnetion will become apparent from the following description when taken in conjunction with the accompanying drawings, in which:

FIGS. 2 to 4 are views similar to FIG. 1, but showing different conditions of the sunroof structure;

FIGS. 5 to 10 are enlarged sectional views taken along the lines V—V, VI—VI, VII—VII, VIII—VIII, IX—IX and X—X, of FIG. 2 respectively;

FIG. 12 is a plan view of a part of the guide mechanism, showing a guided carry member and a free carry member;

FIG. 13 is a side view taken from the direction of the arrow XIII in FIG. 12;

DETAILED DESCRIPTION OF THE INVENTION

In the following, the present invention will be described in detail with reference to the accompanying drawings. In the description, the terms, such as, front, rear, right, left, forward, rearward and the like, are to be understood with respect to a motor vehicle on which corresponding parts are mounted.

Figure 14:
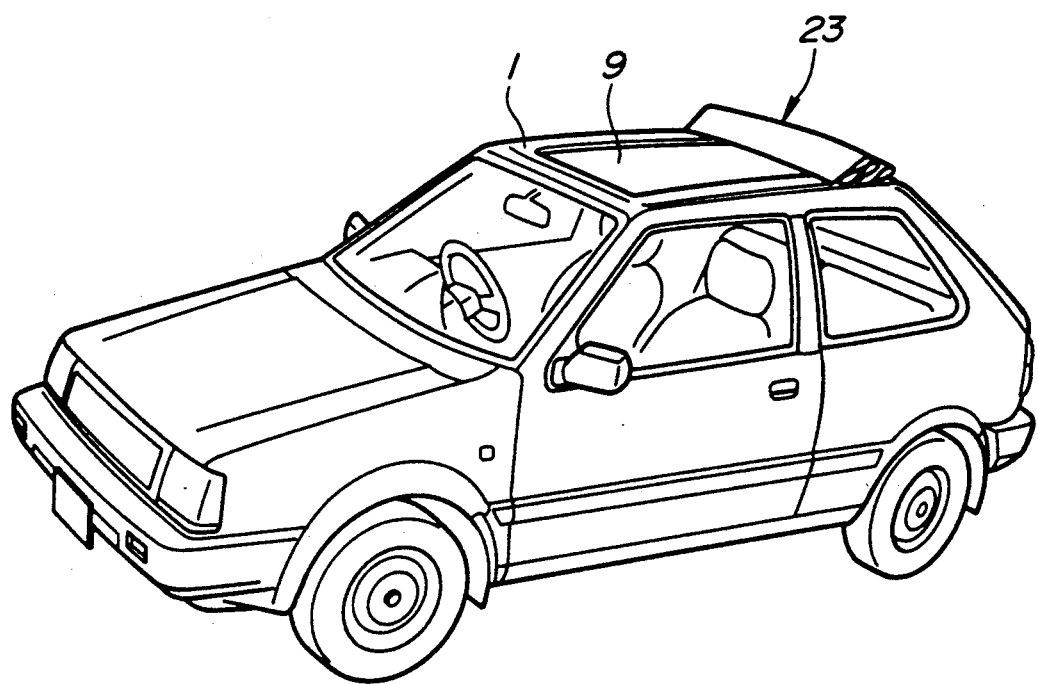
FIG. 14 is a perspective view of a motor vehicle to which the canvas top type sunroof structure of the present invention is practically applied.

Referring to FIG. 14, there is shown a passenger motor vehicle to which a canvas top type sunroof structure of the present invention is practically applied. As shown, the vehicle has a rectangular aperture 9 formed in a roof 1 which includes an inner panel 3 and an outer panel 5 (see FIG. 10).

The sunroof structure comprises generally a pair of (viz., right and left) guide mechanisms which are respectively arranged at lateral sides of the aperture 9 and a canvas top 23 which is slided axially by the guide mechanisms between a full-close position and a full-open position.

Figure 5:
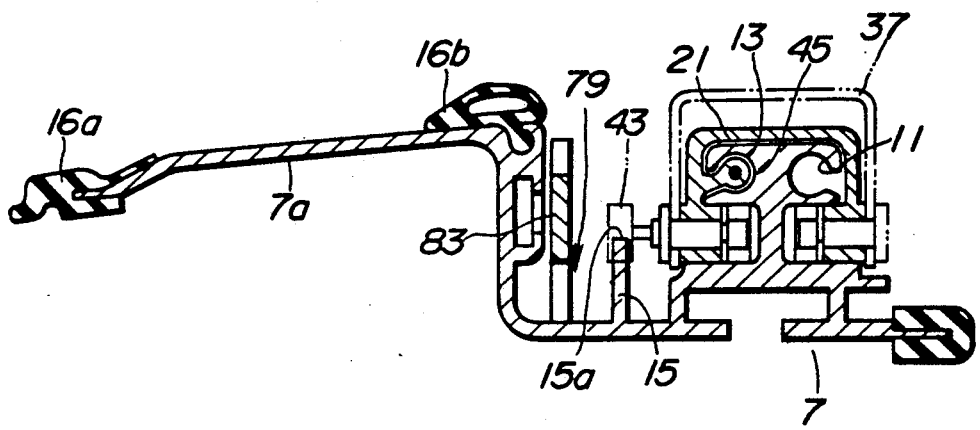
Figure 6:
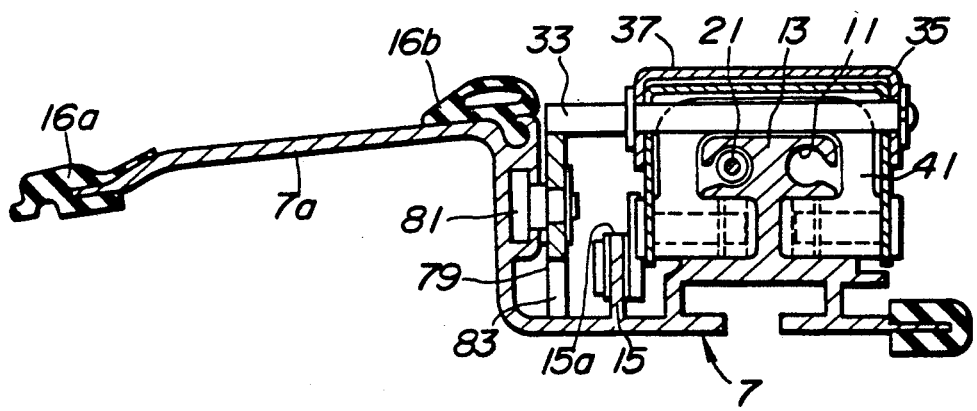
Figure 7:
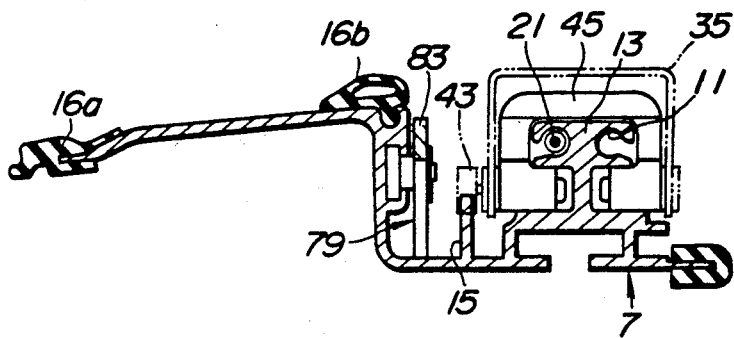

Since the guide mechanisms are substantially the same in construction except for the orientation of parts which constitute each mechanism, the following description will be directed to only one of the guide mechanism, that is, the left mechanism, As is seen from FIG. 5, the guide mechanism comprises a guide member 7 which is secured to the roof 1 and extends along the left (or right) side edge of the aperture 9. The guide member 7 included a rail 13 which has two (viz., outside and inside) cable guide grooves 11 and 11 and a raised wall 15 which extends in parallel with the rail 13. The guide member 7 has an outwardly extended flange portion 7a on which two longitudinally extending weather strips 16a and 16b are mounted for the purpose which will become apparent as the description proceeds.

Figure 11:
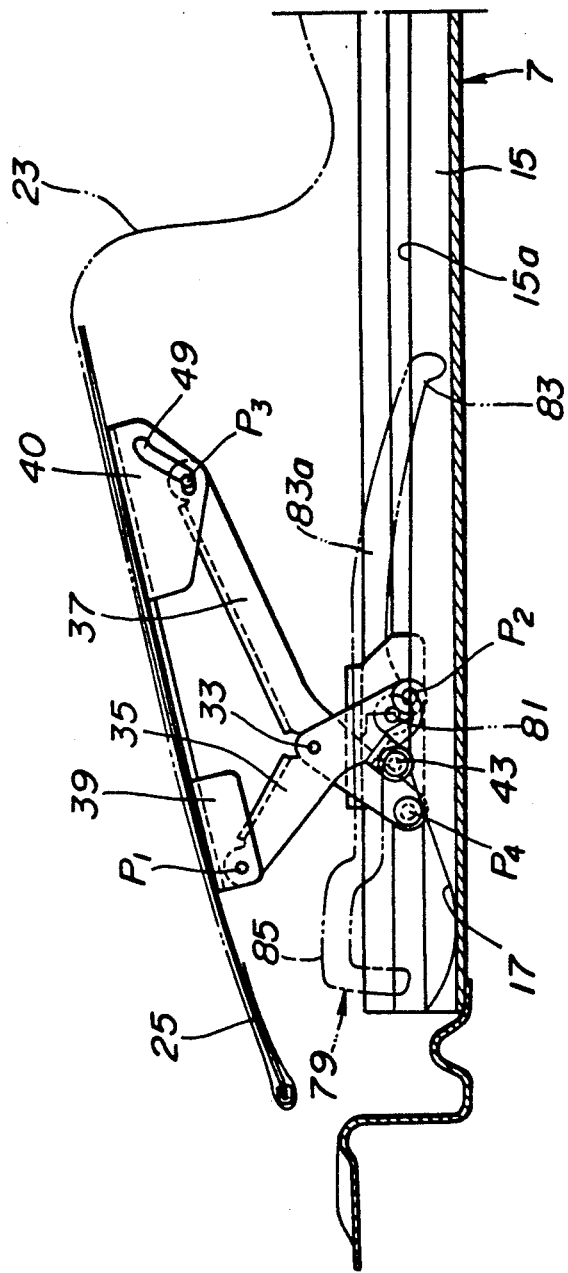
FIG. 11 is an enlarged view of a part which is indicated by the arrow "XI" in FIG. 2.

As is seen from FIG. 11, the raised wall 15 of the guide member 7 has at its major portion a flat top surface 15a and at its front portion a smoothly curved recess 17.

Figure 15:
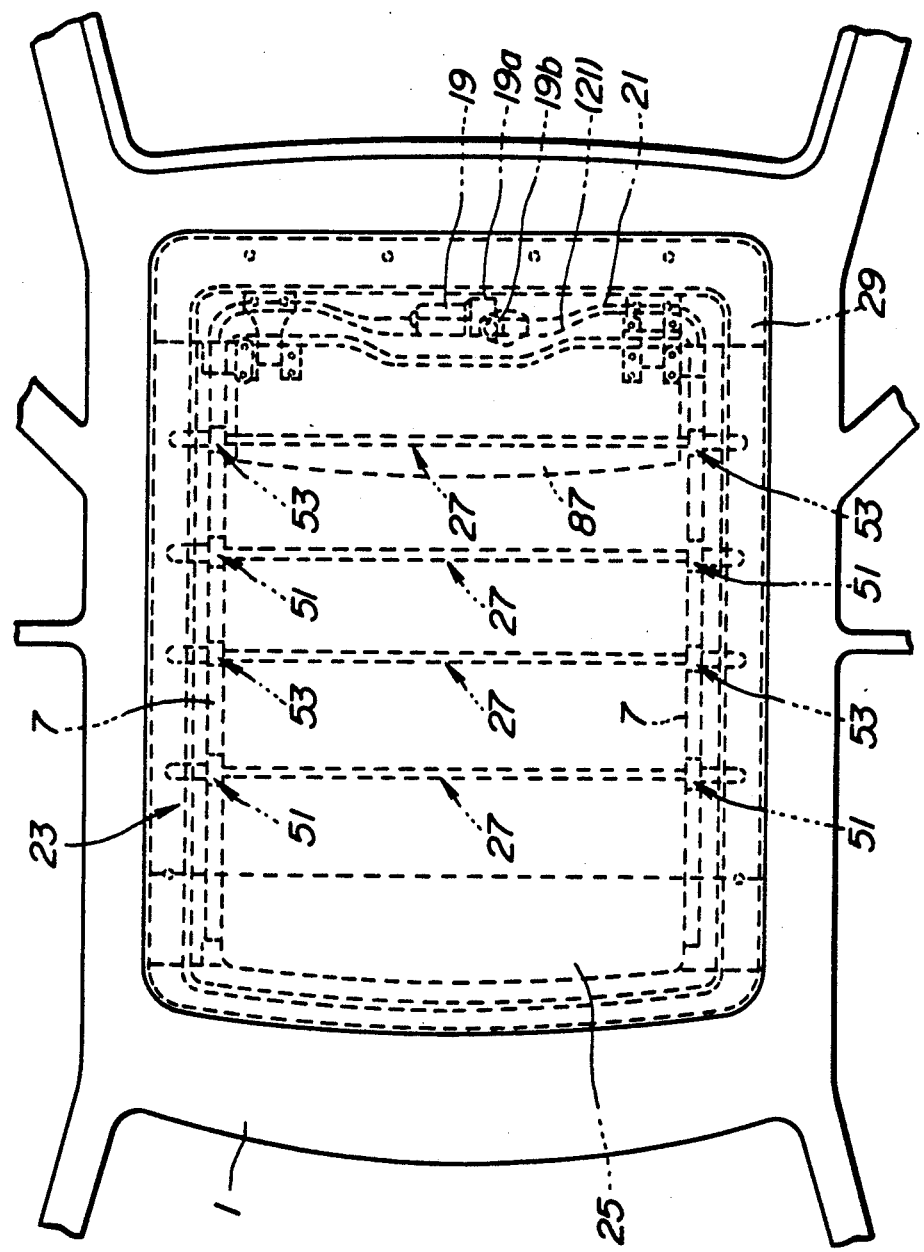
FIG. 15 is a plan view of the canvas top type sunroof structure of the invention in a condition wherein the canvas top fully closes the roof aperture.

As is seen in FIG. 15, a reversible electric motor 19 is mounted to a rear portion of the apertured roof 1, which is controlled by a manual switch (not shown) which is positioned near a driver's seat. The motor 19 has a known speed reduction gear 19a and a pinion 19b which is meshed with a geared cable 21. The geared cable 21 from the pinion 19b is slidably led into the outside cable guide groove 11 of the rail 13 from a rear open end of the groove 11. It is to be noted that the inside cable guide groove 11 is used for receiving an induction part of the other geared cable (not shown) which extends from the right guide mechanism (not shown) through the pinion 19b.

As will be seen from FIG. 9, the canvas top 23 which is carried by the left and right guide mechanisms comprises an outer leather 23a and an inner leather 23b which serves as a head lining of a passenger room. In order to sufficiently stretch the canvas top 23 upon full closing of the same, the outer leather 23a has at each lateral side a longitudinally extending wire 24 installed therein. As will be seen from this drawing, under full closing condition of the canvas top 23, the wire-installed lateral side of the canvas top 23 is pressed against the weather strips 16a and 16b.

As will become apparent as the description proceeds, a front part of the canvas top 23 is supported by a front carry member 25, a major middle part of the same is by guided by carry members 27 and 27' and a rear part of the same is carried by a rear carry member 29.

As is seen from FIG. 15, the front carry member 25 is an elongate member which extends laterally.

As will be seen from FIG. 11, the front carry member 25 has an upper surface fully covered with the canvas top 23 and a lower surface partially covered with a turned over portion of the same. The leading end of the turned over portion is fixed to the front carry member 25.

The front carry member 25 (see FIG. 11) is supported at each lateral side by a first lifting mechanism 31 which is slidable along the guide member 7. As will be clarified hereinafter, the first lifting mechanism 31 is so constructed as to incline the front carry member 25 (as shown in the drawing) forwardly when the latter comes to a front portion of the aperture 9, that is, to the smoothed curved recess 17 of the raised wall 15.

The first lifting mechanism 31 comprises first and second arms 35 and 37 which are pivotally connected through a pivot pin 33 to constitute a X-like structure. An upper end of the first arm 35 is pivotally connected through a pin $P_1$ to a front bracket 39 secured to the front carry member 25. A lower end of the first arm 35 is pivotally connected through a pivot pin $P_2$ to a driven slider 41 and carries thereon a roller 43. The driven slider 41 is slidably engaged with the rail 13 of the guide member 7, and the roller 43 is rotatably put on the raised wall 15. The roller 43 is so arranged as to be placed on a rear slope of the recess 17 when the canvas top 23 assumes its fully closing position. An upper end of the second arm 37 is pivotally connected through a pin $P_3$ to a rear bracket 40 secured to the front carry member 25. As shown, the rear bracket 40 has an elongate guide slot 49 to which the pin $P_3$ is slidably engaged. A lower end of the second arm 37 is pivotally connected through a pivot pin $P_4$ to a drive slider 45 which is slidably engaged with the rail 13 in front of the driven slider 41.

As is seen from FIG. 5, the drive slider 41 has the geared cable 21 anchored thereto, and thus the drive slider 41 is moved forward and rearward by the geared cable 21.

The raised wall 15 is so designed that when the drive slider 45 is moved rearward pushing the driven slider 41 in the same direction, the rear slope obstructs somewhat a rear movement of the roller 43 of the first arm 35. With this, the second arm 37 is caused to pivot counterclockwise about the pivot pin 33.

The elongate guide slot 49 of the rear bracket 40 has a shape which corresponds to a path which is drawn by the pin $P_3$ when the second arm 37 is pivoted about the pivot pin 33. Thus, the pin $P_3$ can smoothly slide in and along the slot 49.

As is seen from FIG. 15, the guided and free carry members 27 and 27' which support the major middle part of the canvas top 23 are four in number and are equally spaced. As shown, the guided and free carry members 27 and 27' are arranged alternately. As will become apparent hereinafter, the free carry members 27' are supported by the guided carry members 27 respectively.

As is seen from FIG. 12, each guided carry member 27 comprises a tubular bow member 50 and a guided slider 51 which nonrotatably carries one end of the bow member 50. The guided slider 51 is slidably engaged with the rail 13 of the guide member 7.

As is seen from FIG. 13, for achieving the nonrotable connection of the bow member 50 to the guided slider 51, the guided slider 51 has a boss 51a of X-shaped cross section and each end of the bow member 50 has a recess 50a of X-shaped cross section which is mated with the boss 51a. Upon assembly, the bow member 50 is held with its middle portion somewhat raised from its both ends.

Referring back to FIG. 12, each free carry member 27' comprises a tubular bow member 50 and a free slider 53 which nonrotatably carries one end of the bow member 50. Similar to the case of the guided carry member 27, the free slider has a X-shaped boss 53a and each end of the bow member 50 has a X-shaped recess 50a which is mated with the boss 53a.

The free slider 53 is movable upward and downward for the reason which will be described hereinafter.

Figure 8:
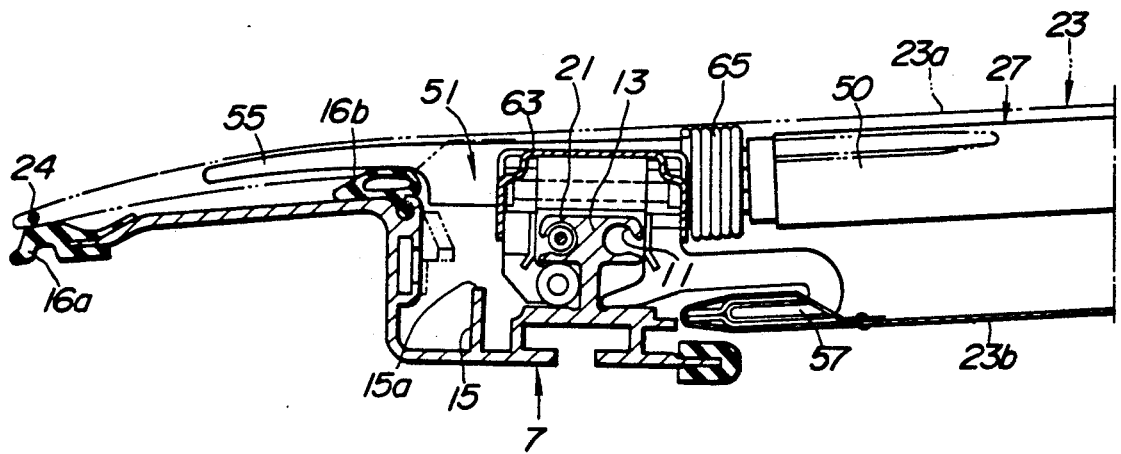

As is shown in FIG. 8, each slider 51 or 53 is formed with both a first tongue portion 55 which is received in a turned over or sack portion of the outer leather 23a and a second tongue portion 57 which is received in a turned over or sack portion of the inner leather 23b.

Figure 18:
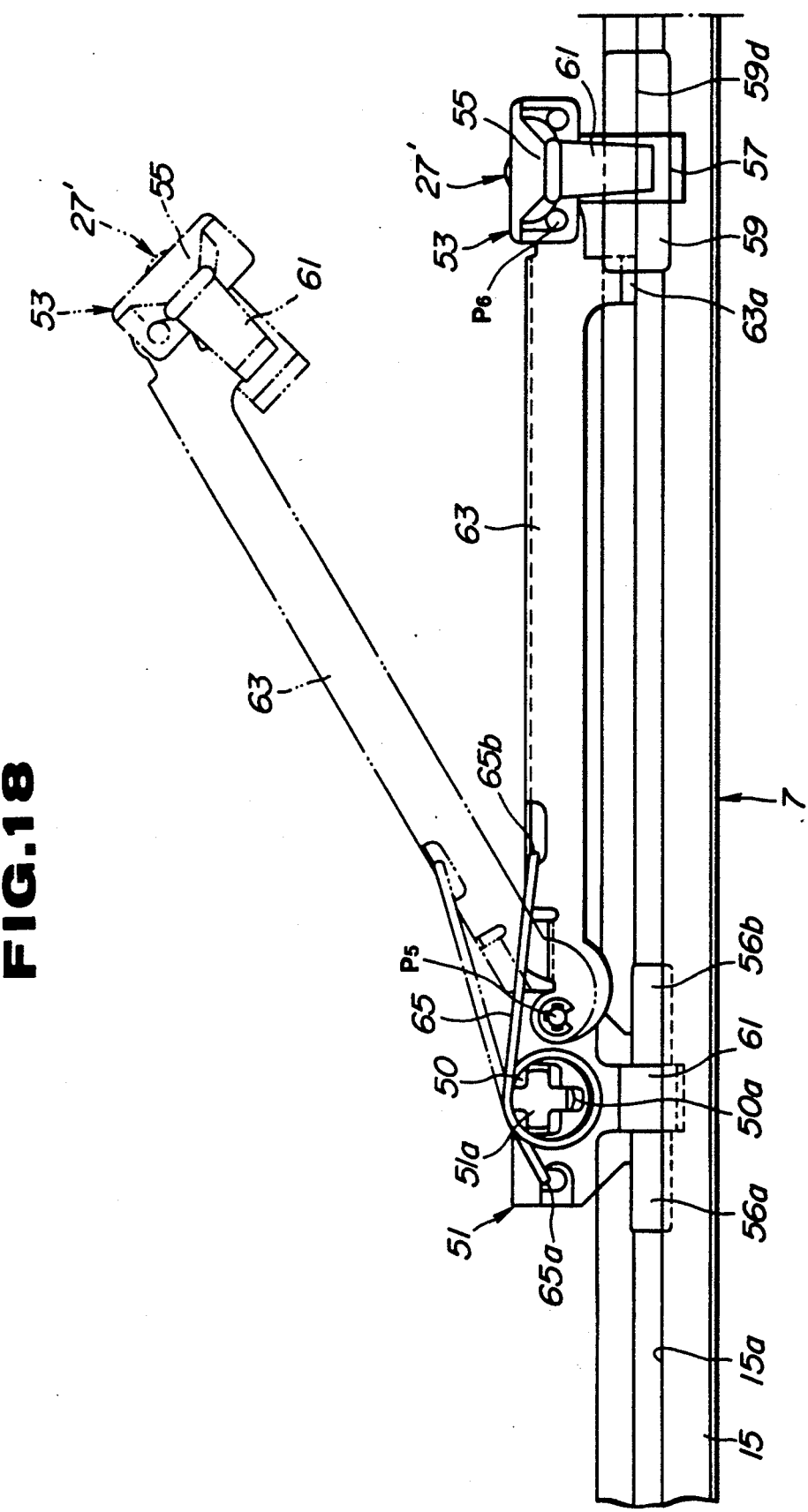
FIG. 18 is a view similar to FIG. 13, but showing a guide member by which the guided carry member is slidably guided.

As is seen from FIG. 13 and 18, the guided slider 51 is further formed with front and rear extensions 56a and 56b. The free slider 53 is provided with a hook portion 61 which is, when the canvas top 23 assumes its fully closing position, detachably engaged with an engaging member 59 (see FIGS. 9 and 10) secured to the guide member 7.

It is to be noted that the engaging surface of the engaging member 59 is so shaped as to permit a latching engagement between the hook portion 61 and the engaging member 59 when the hook portion 61 is forced to press against the engaging member 59 in rearward, forward and/or downward direction.

Figure 16:
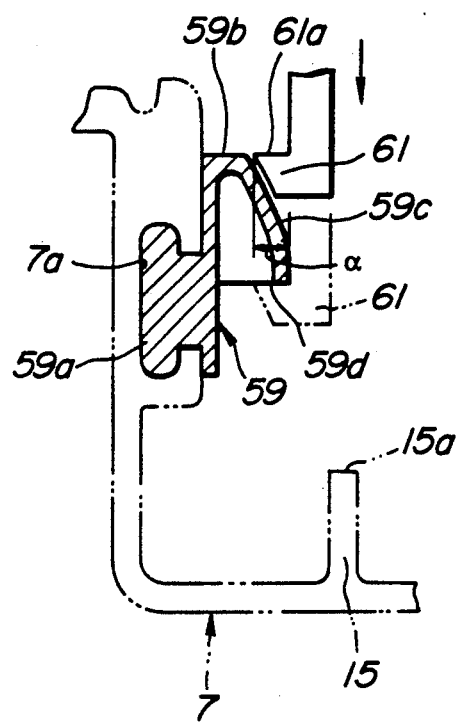
FIG. 16 is a sectional view of an engaging member and a hook portion.
Figure 17:
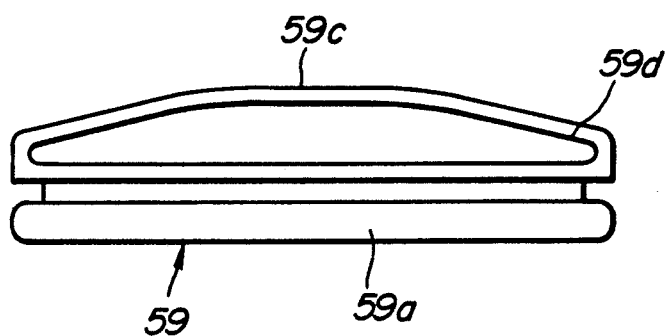
FIG. 17 is a bottom view of the engaging member.

As is best shown in FIGS. 16 and 17, the engaging member 59 comprises a base portion 59a which is snugly received in a groove 7a of the guide member 7, a swelling wall portion 59c which extends downward from an upper surface 59b and an elongate horizontal surface 59d which defines the lower edge of the swelling wall portion 59c. The hook portion 61 of the free slider 53 comprises a hook proper having an engaging surface 61a which is latchingly engageable with the horizontal surface 59d of the engaging member 59. As is seen from FIG. 16, when the hook proper 61 is pushed downward, the same is permitted to achieve a latching engagement with the horizontal surface 59d of the engaging member 59 by flexing the swelling wall portion 59c by a degree of "α(alpha)".

As is seen from FIGS. 12 and 13, the free slider 53 is pivotally supported by a hinge arm 63 which is, in turn, pivotally mounted on the guided slider 51. The hinge arm 63 is of a channel member (see FIG. 8) and arranged with its open side facing downward. As is best shown in FIG. 13, one (viz., lower) end of the hinge arm 63 is pivotally connected through a pivot pin $P_5$ to the guided slider 51, while the other (viz., upper) end of the same is pivotally connected through a pivot pin $P_6$ with the free slider 53. As is seen from FIG. 12, the hinge arm 63 is formed near the top thereof with spaced pieces 63a and 63a. These pieces 63a and 63a are brought into slidable engagement with the rail 13 of the guide member 7 when the canvas top 23 assumes its fully closing position. Thus, under this fully closing position, the hinge arm 63 is prevented from making a lateral play.

The hinge arm 63 is biased upward by a coil spring 65 which has a multi-turned portion disposed about the boss 51a of the guided slider 51. One end 65a of the spring 65 is hooked to the guided slider 51 and the other end 65b of the same is hooked to the hinge arm 63, as shown in FIG. 12. Thus, it will be appreciated that the free slider 53 is constantly biased upward by the spring 65 with respect to the guided slider 51.

Referring back to FIG. 15, the rear carry member 29 is an elongate member which extends laterally.

As is seen from FIG. 10, each lateral end of the rear carry member 29 has a slider 66 which is slidably engaged with the rail 13 of the guide member 7. Similar to the case of the afore-mentioned front carry member 25, the rear carry member 29 has an upper surface fully covered with the canvas top 23 and a lower surface partially covered with a turned over portion of the same. The leading end of the turned over portion is fixed to the rear carry member 29.

In order to retain the rear carry member 29 when the canvas top 23 assumes its fully closing position, two lock devices 67 are provided at right and left sides of the rear portion of the roof aperture 9.

Figure 1:
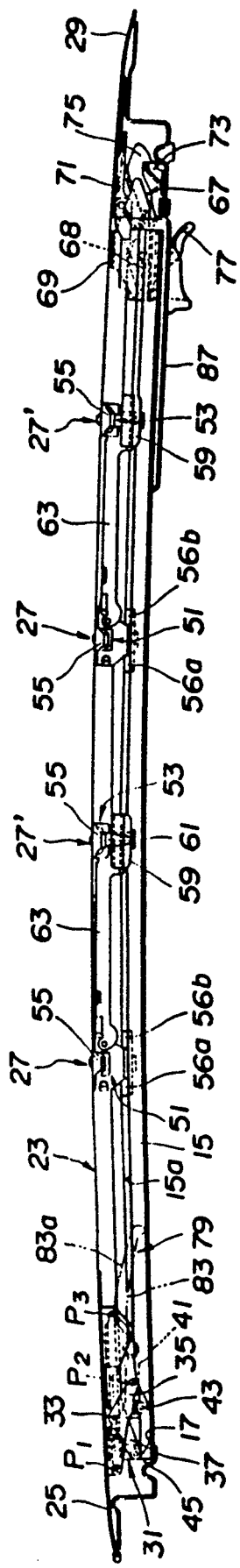
FIG. 1 is a horizontally sectional view of one of the paired guide mechanisms installed in a canvas top type sunroof structure of the present invention.

As will be seen from FIG. 1, each lock device 67 comprises a handle bracket 69 which slidably engaged with the rail 13 of the guide member 7, a moving bracket 71 which is secured to a lower surface of the rear carry member 29 and connected through a link mechanism 68 to the handle bracket 69, a hook arm 75 which is pivotally connected to the link mechanism 68 and detachably engageable with an engaging piece 73 provided on the inner panel 3 of the roof 1, and an operation handle 77 by which the engagement between the hook arm 75 and the engaging piece 73 is controlled. The hook arm 75 is so constructed and arranged that when the canvas to 23 assumes the fully closing position, manipulation of the operation handle 77 permits a latched engagement of the hook arm 75 with the engaging piece 73.

The construction of the lock device 67 will be described in detail with reference to FIG. 20. The lock device 67 comprises the handle bracket 69 to which the operation handle 77 is connected through a shaft 77a.

Figure 20:
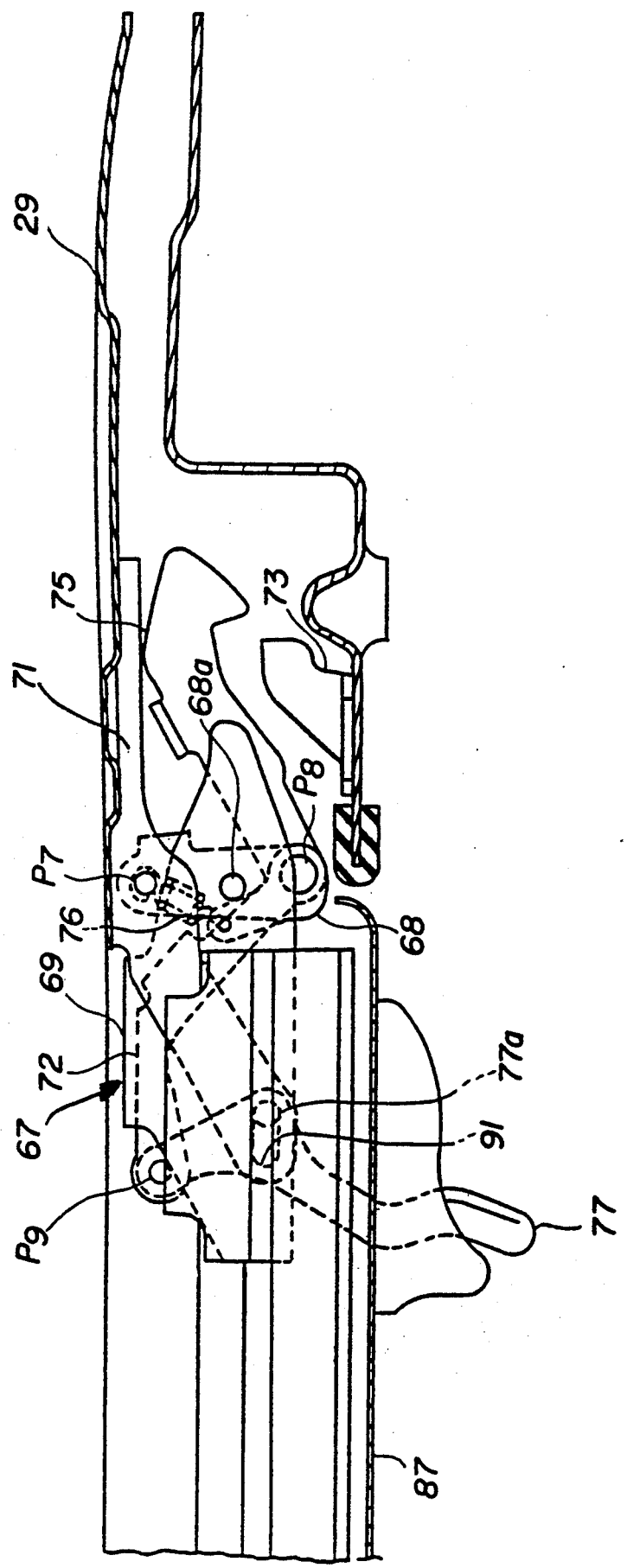
FIG. 20 is an enlarged sectional view of a lock device.

The operation handle 77 is pivotal between a lock position illustrated in FIG. and an unlock position illustrated in FIG. 20 in a snap action manner. That is, when a later-mentioned pin P9 carried by the operation handle 77 goes beyond a given horizontal imaginary plane which includes the axis of the shaft 77a, the operation handle 77 is rushed into one position due to force produced by a biasing means. The shaft 77a is slidably received in an elongate slot 91 formed in the moving bracket 71 which is secured to the rear carry member 29. In this pivoted portion, the moving bracket (71) side and the handle bracket (69) side are connected through the elongate slot 91 through which the shaft 77a passes.

To the handle bracket 69, there is connected a first link 68 through a pivot pin 68a. An upper end of the first link 68 is pivotally connected through a pivot pin P7 to the moving bracket 71, while/ the a lower end of the first link 68 is pivotally connected through a pivot pin P8 to the hook arm 75. A second link 72 is pivotally connected through respective pivot pins P9 and P8 to the operation handle 77 and the first link 68 to effect a synchronous operation of them.

Figure 21:
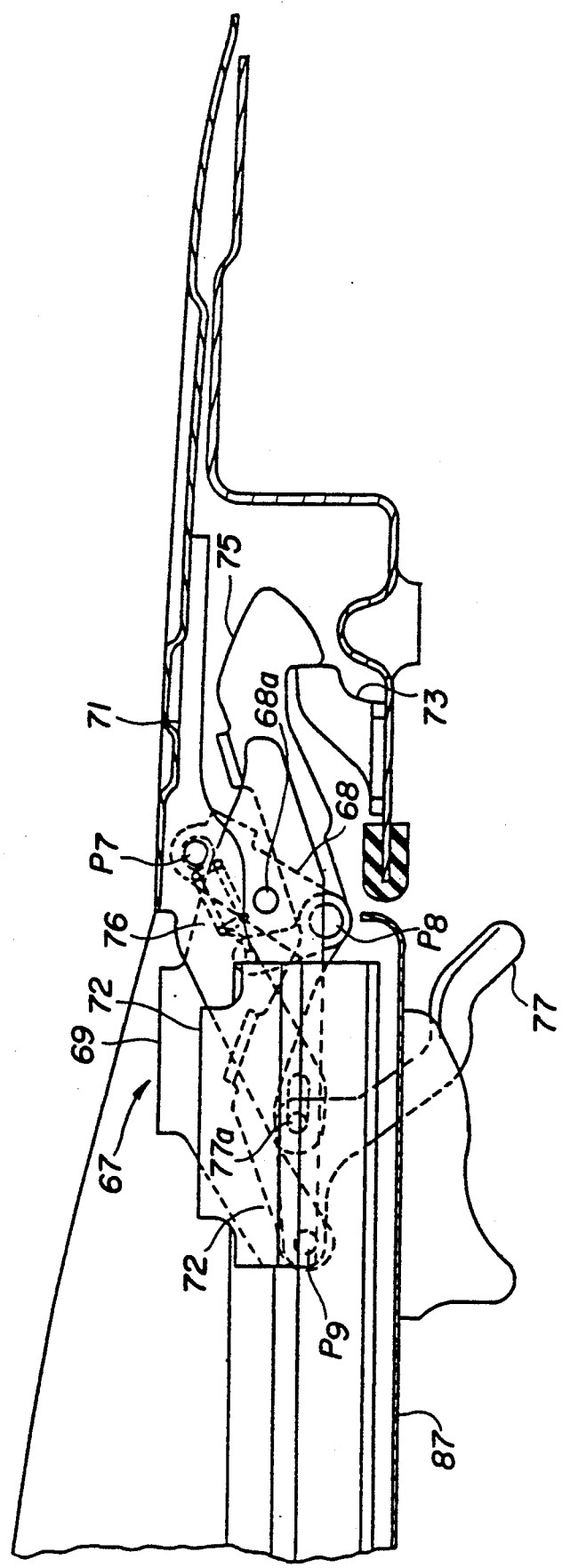
FIG. 21 is a view similar to FIG. 20, but showing a condition different from that of FIG. 20.
Figure 22:
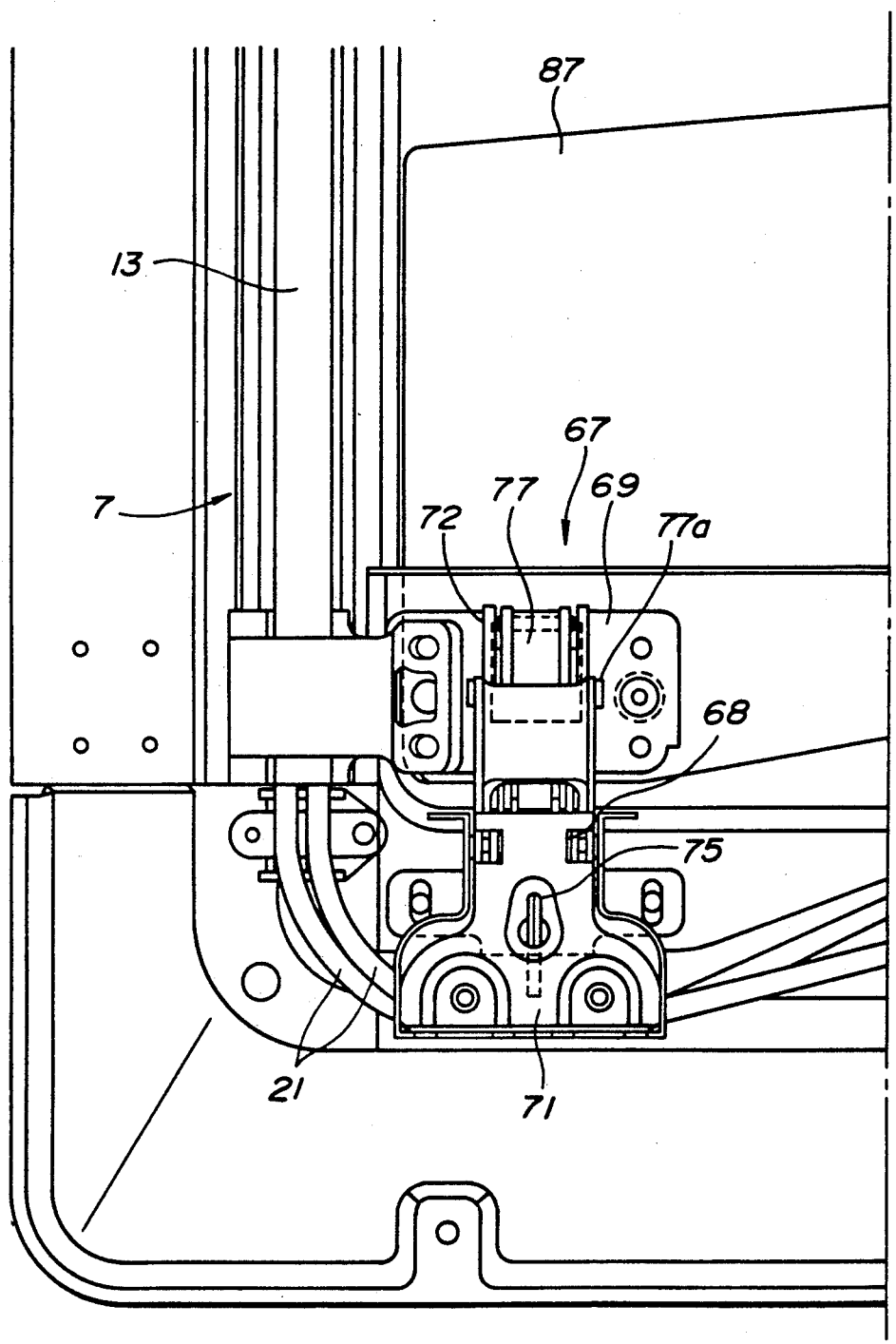
FIG. 22 is a plan view of the lock device.

When the operation handle 77 is in the lock position illustrated in FIG. 21, the first link 68 assumes an inclined position. In this condition, the hook arm 75 is latchingly engaged with the engaging piece 73 of the inner panel 3 thereby to accomplish a lock condition of the lock device 67. When the operation handle 77 is in the unlock position illustrated in FIG. 20, the first link 68 assumes a vertical position. In this condition, the hook arm 75 is raised disengaging from the engaging piece 73. That is, when the first link 68 is moved from the vertical position to the inclined position, a displacement in fore-and-aft direction and a displacement in a vertical direction are produced by the first link 68.

The hook arm 75 has a hook proper which is latchingly engageable with the engaging piece 73 secured to the inner panel 3, and a biasing spring 76 is connected to the hook arm 75 to bias the same in a downward direction. One end of the spring 76 is hooked to the pin P7 and the other end of the same is hooked to a projection formed on the hook arm 75.

As is seen from FIG. 11, a second lifting mechanism 79 is further arranged at a front portion of the guide member 7, which functions to incline the front carry member 25 forwardly when the rear carry member 29 is moved to its foremost position. The second lifting mechanism 79 comprises a holding lever 83 which is pivotally connected through a pivot pin 81 to the guide member 7. The holding lever 83 is formed at its front part with an upwardly raised press portion 85. The lever 83 has a rear part 83a which extends rearward from the pivoted portion.

As will be seen from FIG. 1, when the canvas top 23 is in the fully closing position, the press portion 85 is placed below the pivot pin 33 of the first and second arms 35 and 37 of the first lifting mechanism 31, assuming its inoperative position. However, when the front extension 56 of the foremost guided slider 51 rides on the rear part 83a of the holding lever 83, the press portion 85 is moved upward lifting the pivot pin 33.

Designated by numeral 87 (see FIGS. 1 to 4) is a cover plate which is secured to and extends forwardly from the rear carry member 29. The cover plate 87 functions to conceal, from passengers in the vehicle, the various parts of the canvas top holding mechanism when the canvas top 23 are fully folded at a front or rear portion of the roof aperture 9.

In the following, operation of the sunroof structure of the invention will be described with reference to the drawings.

For ease of understanding, the description will be commenced with respect to a full closed condition of the sunroof structure wherein the canvas top 23 assumes its fully closing position, as shown in FIG. 1. Under this condition, the first lifting mechanism 31 and the second lifting mechanism 79 assume their contracted positions causing the front carry member 25 to be flattened, the free carry members 27' assume their lowermost positions having the hook portion 61 of their free sliders 53 engaged with the engaging member 59 of the guide member 7, and the rear carry member 29 is locked to the rear end portion of the roof aperture 9 through the lock device 67.

Figure 2:
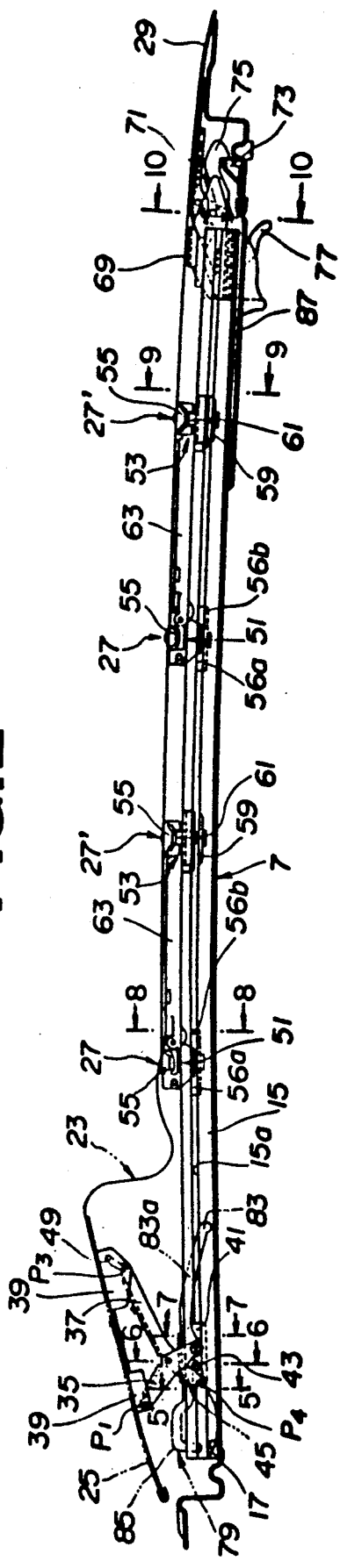

When, due to energization of the electric motor 19, the geared cable 21 is pulled rearward in FIG. 1, the front carry member 25 becomes inclined forward, due to operation of the first lifting mechanism 31, for the reason which has been described hereinafore, as is shown in FIG. 2. Thereafter, the front carry member 25 is moved rearward with its posture kept inclined in response to the rearward movement of the geared cable 21.

Figure 19:
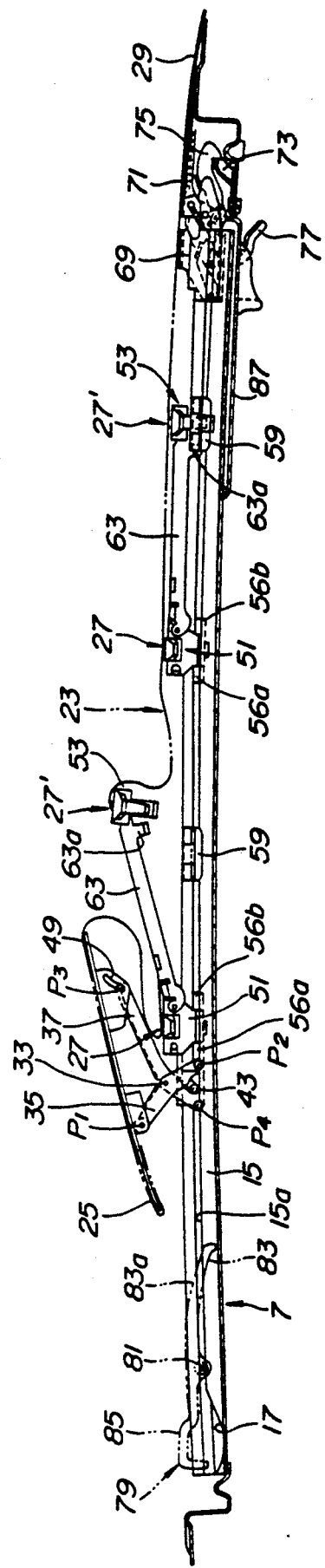
FIG. 19 is a view similar to FIG. 1, but showing a condition wherein a front carry member of the canvas top is moving back.

When, the driven slider 41 of the first lifting mechanism 31 is brought into contact with and pushes the front extension 56a of the foremost guided slider 51, the guided slider 51 is moved rearward and thus the corresponding free slider 53 is moved rearward, due to presence of the folded hinge arm 63, disengaging the hook portion 61 thereof from the engaging member 59 of the guide member 7. Thus, as will be seen from FIG. 19, the free carry member 27' is gradually raised due to the force of the biasing spring 66 in response to the rearward movement of the guided slider 51.

Then, the rear projection 56b of the foremost guided slider 51 is brought into contact with and pushes the front extension 56a of the next guided slider 51 causing the next-positioned free carry member 27' to be gradually lifted. Finally, the front carry member 25 comes to its rearmost position having two folds of the canvas top 23 formed behind the front carry member 25, as shown in FIG. 3. Upon this, energization of the electric motor 19 is ceased, and the full-open condition of the sunroof structure is established.

Under this full-open condition, the front carry member 25 is kept inclined as shown in FIG. 3. This inclination brings about an enlargement of the roof aperture 9 by a degree corresponding the zone denoted by the reference "α(alpha)". In fact, the inclination of the front carry member 25 promotes a compactness of folded canvas top 23 located at the rear portion of the roof aperture 9. It is further to be noted that the forwardly inclined front carry member 25 serves as an air-spoiler when the vehicle moves with the roof aperture 9 open.

When, due to reenergization of the electric motor 19, the geared cable 21 is pushed forward in FIG. 3, the front carry member 25 is moved forward with its posture kept inclined. The forward movement of the front carry member 25 pulls, by means of the canvas top 23, the foremost guided slider 51 and the next guided slider 51 one after another. During the forward movement, the hinge arm 63 of each guided slider 51 is kept inclined.

When the front carry member 25 is brought to its foremost position stretching the canvas top 23, the front carry member 25 becomes flattened and the hinge arms 63 of the guided sliders 51 are pressed downward by the stretched canvas top 23 against the force of the springs 66 and thus the hook portions 61 of the free sliders 53 are brought into engagement with the engaging members 59 of the guide member 7. Thus, the full-closed condition as shown in FIG. 1 is achieved.

When now the operation handle 77 is manipulated, the hook arm 75 of the lock device 67 is disengaged from the engaging piece 73. With this, the rear carry member 29 is released from the engaging piece 73. Thus, the rear carry member 29 can be manually shifted to its foremost postion, as is shown in FIG. 4. When the rear carry member 29 comes to its foremost position, the guided sliders 51 of the guided carry members 27 ride on the rear part 83a of the holding lever 83 thereby moving the press portion 85 of the lever 83 upward and thus lifting the pivot pin 33. Thus, the first lifting mechanism 31 is actuated to assume its expanded condition inclining the front carry member 25 forwardly, as shown in FIG. 4.

Because, under this condition, the front carry member 25 is kept inclined, the guided and free carry members 27 and 27' can be deeply inserted into a space defined below the front carry member 25 by a degree corresponding to the zone denoted by reference "α(alpha)" in FIG. 4. This means that the roof aperture 9 is increased by a degree corresponding to the zone "α". Similar to the above-mentioned full-open condition with the folded canvas top 23 located at the rear portion of the aperture 9, the front carry member 25 can serve as an air-spoiler.

When, thereafter, the full-closing of the canvas top 23 is required, the rear carry member 29 is pulled rearward by means of an operator's hand or hands. When the rear carry member 29 is brought to its rearmost position pulling and thus stretching the canvas top 23, the operation handle 77 of the lock device 67 is turned to the lock position. With this, the hook proper of the hook arm 75 is engaged with the engaging piece 73. During turning of the operation handle 77 to the lock position, the rear carry member 29 is somewhat lowered while moving rearward by the degree of "a". Thus, upon completion of locking of the rear carry member 29, the canvas top 23 is fully stretched and thus strongly pressed against the weather strips 16a and 16b on the apertured roof 1 (see FIG. 10) to achieve a watertight sealing therebetween.

When the rear carry member 29 is moved rearward with the operation handle 77 kept in the lock position, the arrival of the rear carry member 29 to its rearmost position causes instant locking of the hook proper with the engaging member 73. That is, a so-called "self-locking" is accomplished in this case.

In addition to the above, the following operation is further available to keep the folded canvas top 23 at a middle part of the roof aperture 9. In this case, the respective areas above the front and rear seats are opened.

Figure 23:
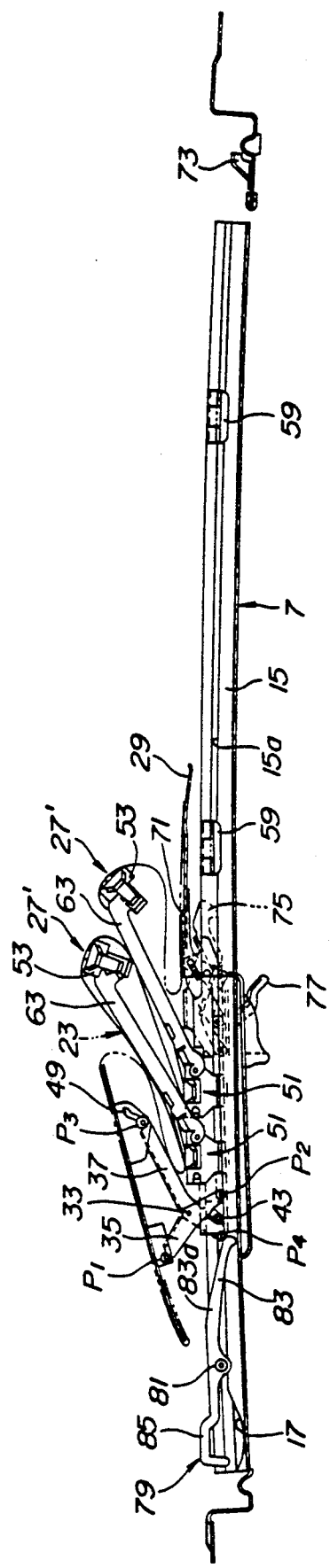
FIG. 23 is a view similar to FIG. 1, but showing a condition wherein a unit including the front carry member, the folded canvas top and the rear carry member is placed at a middle part of the roof aperture.

That is, first, due to operation of the electric motor 19, the front carry member 25 is moved rearward or foreward to a middle part of the aperture 9, then, the rear carry member 29 is manually moved to the middle part. Then, the operation handle 77 is turned to the lock position to press lateral sides of the canvas top 23 against the weather strips 16a and 16b. This will be seen from FIG. 23. Under this, the front carry member 25 is not moved due to the nature of the geared cable 21 connected thereto, and the rear carry member 29 is kept stationary due to a considerable sliding resistance of the canvas top 23 to the weather strips 16a and 16b.

When, thereafter, full-closing of the canvas top 23 is required, the front carry member 25 is moved to its foremost position due to energization of the electric motor 19, and then, the rear carry member 29 is manually moved to its rearmost locked position.

The full-closing of the canvas top 23 is also achieved by employing the following operation.

That is, first, the front carry member 25 is moved backward by energizing the electric motor 19 to a rear position where the rear carry member 29 is locked to the engaging piece 73, and then, the front carry member 25 is moved forward to its foremost position by reenergizing the electric motor 19.

In the following, advantages of the present invention will be described.

(a) Since the opening movement of the canvas top 23 is available from not only the front part thereof but also a rear part thereof, a large open space can be provided at various parts of the roof aperture 9. That is, a full open space can be provided above the rear seat, which is not expected from the conventional sunroof structure of the above-mentioned reference.

(b) Even if the electric system for controlling the canvas top 23 fails to operate, the opening movement of the canvas top 23 is achieved by means of manual labor as has been described hereinabove.

(c) Since the front carry member 25 is kept inclined forward when the canvas top 23 is fully folded, compactness of a unit including the front carry member 25 and the folded canvas top 23 is achieved.

(c) Since the front carry member 25 is kept inclined forward when the canvas top 23 assumes an open position, the same can serve as an air spoiler.

(d) When the sunroof structure is in the fully closed condition, not only the rear carry member 29 locked by the lock device 67 but also the front carry member 25 is substantially locked by the geared cable 21, the stretched condition of the canvas top 23 is assuredly maintained.

(e) Due to provision of the lock device 67 having the above-mentioned function, the locking of the rear carry member 29 to the engaging piece 73 induces the vertical and horizontal displacements of the rear carry member 29. Thus, the canvas top 23 can be fully stretched and the rear carry member can be flush with the outer surface of the roof 1 of the vehicle.

What is claimed is:

1. A sunroof structure for a motor vehicle having an apertured roof, said sunroof structure comprising:
 a pair of guide members which extend along respective sides of the aperture of said roof;
 a canvas top adapted to cover said aperture;
 a front carry member having a front part of said canvas top secured thereto;
 guided carry members carrying thereon a major middle part of said canvas top;
 a free carry member connected to each of said guided carry members, each free carry member carrying thereon the major middle part of said canvas top;
 biasing means for biasing each free carry member upward relative to the corresponding guided carry member;
 a rear carry member having a rear part of said canvas top secured thereto;

means for slidably guiding said front carry member, said guided carry members, and said rear carry member on said guide members;

electric drive means for driving said front carry member forward and rearward along said guide members; and lock means for selectively locking and unlocking said rear carry member to a rear given portion of said roof;

a first lifting means interposed between each guide member and one lateral side of said front carry member, for inclining the front carry member forwardly when said front carry member comes to a front given portion of the roof aperture;

said first lifting means comprising:

first and second arms which are pivotally connected to each other to constitute an X-like structure;

a front bracket secured to said front carry member and having a portion to which one end of said first arm is pivotally connected;

a driven slider connected to said guide member and being slidably guided by said guide member and having a portion to which the other end of said first arm is pivotally connected;

a roller carried by said first arm and rotatably mounted on a raised wall defined by said guide member;

a rear bracket secured to said front carry member and having a portion to which one end of said second arm is pivotally connected through a pivot pin, said rear bracket having an elongate slot through which said pivot pin is slidably passed; and a drive slider connected to said guide member and slidably guided by said member and having a portion to which the other end of said second arm is pivotally connected.

2. A sunroof structure for a motor vehicle having an apertured roof, said sunroof structure comprising:

a pair of guide members which extend along respective sides of the aperture of said roof;

a canvas top adapted to cover said aperture;

a front carry member having a front part of said canvas top secured thereto;

guided carry members carrying thereon a major middle part of said canvas top;

a free carry member connected to each of said guided carry members, each free carry member carrying thereon the major middle part of said canvas top;

biasing means for biasing each free carry member upward relative to the corresponding guided carry member;

a rear carry member having a rear part of said canvas top secured thereto;

means for slidably guiding said front carry member, said guided carry members, and said rear carry member on said guide members;

electric drive means for driving said front carry member forward and rearward along said guide members; and lock means for selectively locking and unlocking said rear carry member to a rear given portion of said roof, said lock means including:

a handle bracket slidably engaged with a rail of said guide members;

an operation handle pivotally connected to said handle bracket through a shaft;

biasing means for pivoting said operation handle in a snap action manner;

a moving bracket secured to said rear carry member, said moving bracket having an elongate slot through which said shaft passes;

a first link pivotally connected to said handle bracket and having one end pivotally connected to said moving bracket;

a hook arm to which the other end of said first link is pivotally connected;

a second link pivotally connected through respective pivot pins to said operation handle and said first link; and an engaging means secured to the rear given portion of said roof for latching a hook portion defined by said hook arm.

3. A sunroof structure for a motor vehicle having an apertured roof, said sunroof structure comprising:

a pair of guide members which extend along respective sides of the aperture of said roof;

a canvas top adapted to cover said aperture;

a front carry member having a front part of said canvas top secured thereto; member communicating with said guide members and being slidably guided by said guide members;

guided carry members carrying thereon a major middle part of said canvas top;

a free carry member connected to each of said guided carry members, each free carry member carrying thereon the major middle part of said canvas top;

biasing means for biasing each free carry member upward relative to the corresponding guided carry member;

a rear carry member having a rear part of said canvas top secured thereto;

means for slidably guiding said front carry member, said guided carry members, and said rear carry member on said guide members;

electric driver means for driving said front carry member forwards and rearward along said guide members;

lock means for selectively locking and unlocking said rear carry member to a rear given portion of said roof; and engaging means for latching said free carry members to said guide members when the free carry members are pressed against said guide members by a force which is produced when said canvas top is fully stretched.

4. A sunroof structure as claimed in claim 1, further comprising engaging means for latching said free carry members to said guide member when the free carry members are pressed against said guide member by a force which is produced when said canvas top is fully stretched.

5. A sunroof structure as claimed in claim 4, in which said engaging means comprises:

a hook portion defined by said free carry member; and an engaging member secured to said guide member, said engaging member being so shaped as to permit a latching engagement between the hook portion and the engaging member when said hook portion is forced to press against the engaging member.

6. A sunroof structure as claimed in claim 4, in which said free carry member is pivotally supported by said guided carry member through a spring-biased hinge arm.

7. A sunroof structure as claimed in claim 6, in which said hinge arm is formed with spaced pieces which are brought into slidable engagement with given portions of said guide member when said hinge arm is contracted toward said guide member against the biasing force.

8. A sunroof structure as claimed in claim 7, in which said guided carry member comprises:
   a guided slider slidably engaged with a rail defined by said guide member; and
   a tubular bow member nonrotatably held by said guided slider, said tubular bow member carrying thereon said canvas top.

9. A sunroof structure as claimed in claim 8, in which said free carry member comprises:
   a free slider pivotally connected through said hinge arm to said guided slider;
   a tubular bow member nonrotatably held by said free slider, said tubular bow member carrying thereon said canvas top.

10. A sunroof structure as claimed in claim 9, in which each of said guided and free sliders is formed with first and second tongue portions which are respectively received in pockets formed by said canvas top.

11. A sunroof structure as claimed in claim 6, in which said lock means comprises:
   a handle bracket slidably engaged with a rail of said guide member;
   an operation handle pivotally connected to said handle bracket through a shaft;
   biasing means for pivoting said operation handle in a snap action manner;
   a moving bracket secured to said rear carry member, said moving bracket having an elongate slot through which said shaft passes;
   a first link pivotally connected to said handle bracket and having one end pivotally connected to said moving bracket;
   a hook arm to which the other end of said first link is pivotally connected;
   a second link pivotally connected through respective pivot pins to said operation handle and said first link.

12. A sunroof structure as claimed in claim 11, in which said lock means further comprises an engaging piece which is secured to the roof to latchingly catch a hook portion defined by said hook arm.

13. A sunroof structure as claimed in claim 12, further comprising a biasing spring means which is connected to said hook arm bar biasing the same in a given direction.

14. A sunroof structure as claimed in claim 6, further comprising a second lifting mechanism which inclines said front carry member forwardly when the rear carry member is moved to its foremost position.

15. A sunroof structure as claimed in claim 14, in which said second lifting mechanism comprises a holding lever which is pivotally connected to said guide member, said holding lever having at its front part a raised portion and at its rear part a smoothly extending portion.

16. A sunroof structure as claimed in claim 1, in which said electric drive means comprises:
   a reversible electric motor;
   a pinion driven by said motor; and
   a geared cable driven by said pinion and having a leading end secured to said front carry member.

17. A sunroof structure as claimed in claim 16, in which said guide member has a longitudinally extenging groove through which said geared cable runs.

18. A sunroof structure as claimed in claim 17, in which said guide member has an outwardly extended flange portion on which weather strips are mounted.

19. A sunroof structure as claim in claim 3, in which said engaging means comprises:
   a hook portion defined by said free carry member; and
   an engaging member secured to said guide member, said engaging member being so shaped as to permit a latching engagement between the hook portion and the engaging member when said hook portion is forced to press against the engaging member.

* * * * *